(No Model.)
H. STRATER, Jr.
TEMPERATOR FOR BREWERIES.
No. 243,737. Patented July 5, 1881.
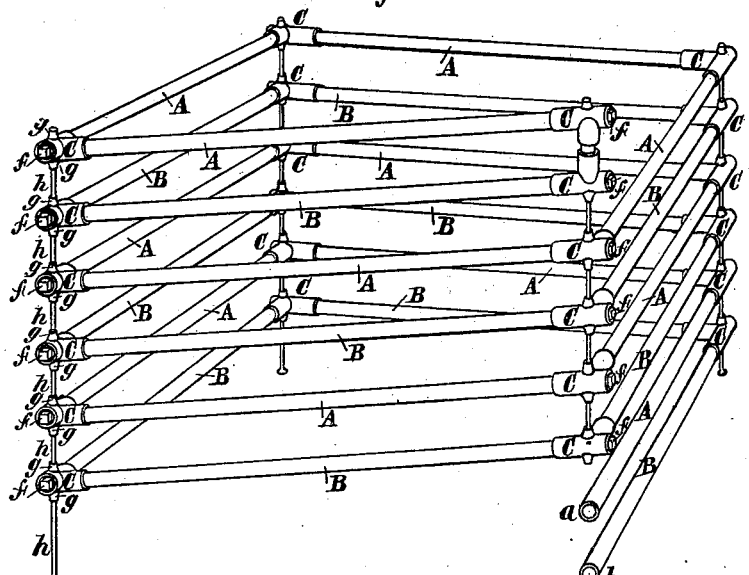
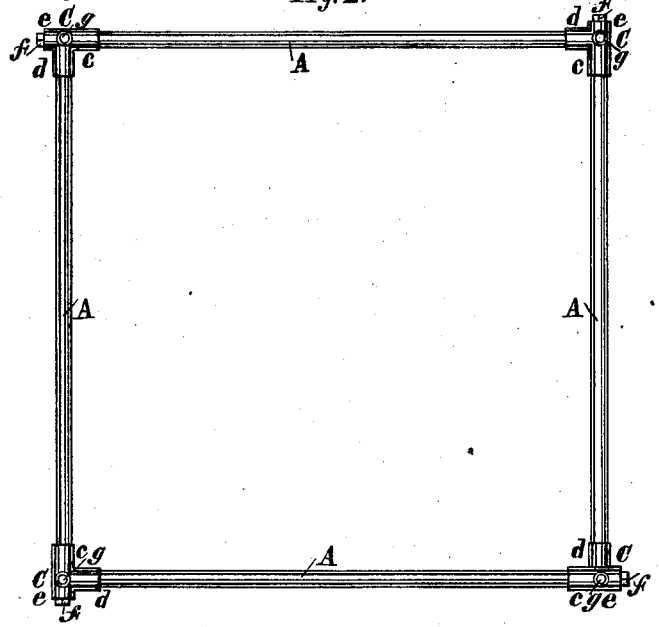
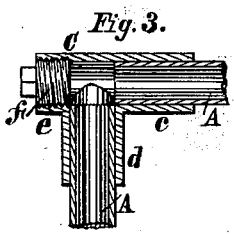
Attest:
Louis Cohen
H. G. Manning
Inventor:
Herman Strater Jr.,
per Edw. Drummer,
Atty.

UNITED STATES PATENT OFFICE.

HERMAN STRATER, JR., OF BOSTON, MASSACHUSETTS.

TEMPERATOR FOR BREWERIES.

SPECIFICATION forming part of Letters Patent No. 243,737, dated July 5, 1881.

Application filed April 28, 1881. (No model.)

*To all whom it may concern:*

Be it known that I, HERMAN STRATER, Jr., a citizen of the United States, residing at Boston, in the county of Suffolk and State of Massachusetts, have invented a new and useful Temperator for Breweries, of which the following is a specification, reference being had to the accompanying drawings.

My invention relates to a "temperator," so called, employed and adapted especially for controlling fermentation in breweries, distilleries, creameries, &c. Temperators have hitherto been made of pipes bent in the form of circular and spiral coils, which it is quite difficult or impossible to clean on the inside, and which must be made of annealed metal.

It is the object of my invention to construct a temperator in the form of an angular coil, so that straight pipes may be used, and on removing plugs at the angles the interior of each pipe may be reached. Thus, since the pipes do not require bending, harder and thinner metal may be used, through which heat will pass more readily, and, since the interior of the pipes may be so easily reached, cleaning is made possible and an easy operation. In constructing the temperator I join the adjacent ends of the straight pipes by angular or T-shaped couplings having the plugs. Said couplings may have rods or supports fitted thereto, to sustain the temperator and keep the parts thereof in position with reference to each other. Thus the whole temperator is of quick and economic construction, and may be kept in a condition for the most successful operation, while the ordinary circular temperator is expensive, requiring thicker metal, and that the pipes should be bent, and must be thrown aside, after being in use but a comparatively short time, on account of the coating deposited on the inside.

In the drawings, Figure 1 is a perspective view of a temperator embodying my invention. Fig. 2 is a plan view of the same. Fig. 3 is a section through one of the couplings and ends of the pipes connected with the same, drawn on a larger scale than Figs. 1 and 2.

Water, which is used for cooling, enters the end *a* of one of the pipes A, and, passing through the pipes A, returns through the pipes B, and makes its exit at the end *b* of one of the pipes B. The adjacent ends of any two of the pipes A or B are joined by means of a coupling, C, which, being of angular form, gives the angular shape to the temperator. Each coupling C is constructed in the form of two short tubes joined so as to make a T, and is preferably cast as one piece. One end, *c*, receives the end of one of the straight pipes, and another end, *d*, receives the end of another of the straight pipes, while in the remaining end *e* is placed a plug, *f*. The pipes may be fastened in the coupling in any suitable manner by soldering or otherwise. The plug *f* may be screwed into the coupling, as illustrated, though other ways of fastening may be employed.

The couplings are so arranged in the temperator that the interior of each of the straight pipes A and B may be entered at one end thereof, after removing the corresponding plug, *f*, by a suitable instrument, by means of which the whole pipe may be cleaned on the inside surface. That such cleaning may thus be readily and effectually done is obvious.

On each coupling C is cast one or more bosses, *g*, into which rods *h* may be inserted, to form supports to sustain the temperator and keep the parts thereof in suitable relative position, as shown.

I claim as my invention—

1. A temperator constructed of straight pipes, the adjacent ends of which are so joined that each pipe may, on removing a suitable plug, have a direct passage outward, substantially as and for the purpose set forth.

2. In a temperator, a coupling for joining the ends of two pipes, of T shape, and having a plug for one of its ends, substantially as specified.

3. A coupling for pipes, of T shape, having a plug for one end, and having one or more bosses cast thereon as a support or as supports, or to receive one or more supports for a temperator formed of said pipes, substantially as specified.

HERMAN STRATER, JR.

Witnesses:
EDW. DUMMER,
WM. H. DRURY.